(12) United States Patent
Bindschedler et al.

(10) Patent No.: US 7,757,436 B2
(45) Date of Patent: Jul. 20, 2010

(54) MODULAR GREENING DEVICE FOR FACADES, WALLS OR THE LIKE

(75) Inventors: Pierre Etienne Bindschedler, Obernai (FR); François Lassalle, Erstein (FR)

(73) Assignee: Soprema, Strasbourg (FR)

( * ) Notice: Subject to any disclaimer, the term of this patent is extended or adjusted under 35 U.S.C. 154(b) by 522 days.

(21) Appl. No.: 11/631,153

(22) PCT Filed: Jun. 29, 2005

(86) PCT No.: PCT/FR2005/001657

§ 371 (c)(1),
(2), (4) Date: Mar. 30, 2007

(87) PCT Pub. No.: WO2006/010860

PCT Pub. Date: Feb. 2, 2006

(65) Prior Publication Data

US 2008/0295402 A1    Dec. 4, 2008

(30) Foreign Application Priority Data

Jun. 30, 2004   (FR) ................................. 04 07247

(51) Int. Cl.
*A01G 9/02* (2006.01)
(52) U.S. Cl. ................. 47/65.9; 47/82; 47/83
(58) Field of Classification Search ........... 47/65.5, 47/65.9, 82, 83, 59 R, 62 R–63, 67; 248/220.21, 248/220.22, 220.31, 224.8
See application file for complete search history.

(56) References Cited

U.S. PATENT DOCUMENTS

| 1,743,987 | A | * | 1/1930 | Tinaglia | 47/39 |
|---|---|---|---|---|---|
| 2,121,173 | A | * | 6/1938 | MacPherson | 47/33 |
| 2,279,735 | A | | 4/1942 | Gates | |
| 4,042,201 | A | * | 8/1977 | O'Callaghan | 248/309.1 |
| 4,189,123 | A | * | 2/1980 | Johnson | 248/222.51 |
| 4,213,274 | A | * | 7/1980 | Skaife | 47/81 |
| 4,295,296 | A | | 10/1981 | Kinghorn | |
| 4,310,193 | A | * | 1/1982 | Kolleas | 296/75 |
| 4,313,278 | A | * | 2/1982 | Pointing et al. | 47/1.1 |

(Continued)

FOREIGN PATENT DOCUMENTS

DE    70 04 146    5/1970

(Continued)

*Primary Examiner*—Rob Swiatek
*Assistant Examiner*—Danielle Clerkley
(74) *Attorney, Agent, or Firm*—Young & Thompson (57) ABSTRACT

A greening device for façades or walls, consisting mainly of a support structure fixed on the façade to be covered and by at least two modules with flat structure and square or rectangular profile, containing a cultivating substrate and including on one of its large surface apparent vegetation elements, the modules being removably mounted on the support structure substantially concealing the latter. The support structure includes at least two spaced apart vertical rails whereon the modules are mounted in vertical rows being located away from the façade or wall and being individually detachable, each module being in the form of a box with globally flat parallelepiped structure of slight thickness compared to its lateral dimensions, the open side of the box opposite the base being closed with an open-work wall. The vertical opposite side walls have catching elements designed to co-operate with reception sites on the mounting rails.

18 Claims, 12 Drawing Sheets

U.S. PATENT DOCUMENTS

| | | | |
|---|---|---|---|
| 4,926,586 A * | 5/1990 | Nagamatsu | 47/65.9 |
| 5,099,606 A | 3/1992 | Koerper | |
| 5,373,662 A | 12/1994 | Wickstrom | |
| 5,579,603 A * | 12/1996 | Fukuzumi | 47/58.1 R |
| 6,606,823 B1 * | 8/2003 | McDonough et al. | 47/65.9 |
| 2002/0007593 A1 | 1/2002 | Mischo | |
| 2002/0104264 A1 | 8/2002 | Chick | |

FOREIGN PATENT DOCUMENTS

| | | |
|---|---|---|
| DE | 26 36 917 | 2/1978 |
| DE | 195 31 647 | 3/1996 |
| DE | 299 09 177 | 9/1999 |
| DE | 199 53 101 | 3/2001 |
| EP | 0 337 085 | 10/1989 |
| EP | 337085 A * | 10/1989 |
| EP | 0 393 735 | 10/1990 |
| EP | 393735 A * | 10/1990 |
| EP | 1 059 396 | 12/2000 |
| EP | 1059396 A1 * | 12/2000 |
| FR | 2 747 265 | 10/1997 |
| GB | 2224191 A * | 5/1990 |
| GB | 2 239 155 | 6/1991 |
| WO | WO 88/06400 | 9/1988 |

* cited by examiner

MODULAR GREENING DEVICE FOR FACADES, WALLS OR THE LIKE

This invention relates to the domain of buildings, engineering structures and civil engineering, more especially the external covering and decoration of such structures, and the object is a modular device for covering facades, walls or the like with vegetation.

More and more often, during new construction or restoration of existing structures or sites, requirements relating to the integration of surfaces that are completely or partially covered with vegetation have been imposed.

Various approaches are known, some older, some more recent.

Thus, traditional techniques consist in the planting of climbing plants at the foot of the walls. This principle has been improved in Germany especially, over about the last fifteen years, with a focus on anchoring systems, on suitable fastenings, with consideration of restrictions associated with the building.

More recently, various procedures have been suggested that make it possible to cover walls with vegetation by applying to the latter a thick lined or unlined felt with pockets that are filled with a substrate and planted. These systems require permanent irrigation and fertilization systems: the water continuously streaming down the wall is collected in a vat and re-injected at the top of the system.

Finally, other techniques have been used to make noise-abatement walls covered with vegetation.

However, the various known approaches all have defects and/or limitations that restrict their use, considering the limitations (time, care, monitoring, . . . ) that they dictate, their lack of flexibility or the complexity of their execution, implementation or maintenance. In addition, none of these techniques are suitable for lasting coverage of vertical portions of buildings with vegetation, especially if it is a matter of broken-up surfaces or those of irregular geometry, and all require dismantling of a major constituent portion in the case of replacement, treatment or local modification of their layout.

Thus, climbing plants generally take a long time to become established, and then often develop to excess. They can engender problems on the external surfaces of buildings (crumbling of mortar, permanent wetness, . . . ) and generally are rather difficult to manage.

The systems using felt or similar cloth likewise have various drawbacks.

Actually, because the water retention capacity is very low, it requires permanent watering done directly in contact with the wall (this can have an adverse effect on the building) as well as collection of the water at the bottom of the system (in principle re-injected at the top). By virtue of their design, they can only be used over the entire height of the wall, itself free of any opening. For decorative purposes, the vegetation used develops a significant leafy surface (hardy plants) and is very water-intensive, this vegetation being very sensitive to possible interruption of the water supply.

Finally, the aforementioned techniques of vegetation-covered noise-abatement walls all have two common unacceptable aspects in the context of coverage of facades or walls with vegetation, especially vertically, i.e.: the components, optionally in the form of modular plates mounted on a support structure, are heavy and thick (thus difficult to handle) and must always rest on the ground.

The object of this invention is to remedy at least the aforementioned primary defects of existing systems.

For this purpose, the object of the invention is a device for covering facades or walls with vegetation, composed mainly, on the one hand, of a support structure attached to the front of the facade or wall to be covered, partially or entirely, on the other hand, of at least two, preferably a plurality of modules with a flat structure, square or rectangular, containing a cultivation substrate and having on one of its major surfaces visible vegetation elements, these modules being mounted in a stationary manner on said support structure, essentially hiding the latter, device characterized in that the support structure consists essentially of at least two vertical rails spaced apart from one another, on which the modules are mounted in vertical rows located at a distance from the facade or wall, and being individually removable, in that each module has the form of a generally flat vat, with the shape of a parallelepiped, with a small thickness relative to its lateral dimensions and with a bottom wall and lateral walls that are essentially solid, in that the open surface of the vat that is opposite to the bottom is closed by an openwork wall holding the substrate and allowing passage of vegetation elements, and in that the opposite lateral walls, oriented vertically after installation, of each vat are provided with hanging elements designed to interact with suitable receiving sites present on the mounting rails.

The invention will be better understood from the following description that relates to a preferred embodiment, provided as a nonrestrictive example, and explained with reference to the accompanying schematic drawings, in which.

FIGS. 1 to 5, 7, 10 and 11 show a device 1 for covering facades or walls 2 with vegetation, composed mainly, on the one hand, of a support structure 7, 19 attached to the surface 3 of the facade or wall 2 to be covered, partially or completely, on the other hand, of at least two, preferably a plurality, of modules 4 with a flat structure and square or rectangular shape, containing a cultivation substrate 5 and having on one of its major surfaces (visible surface of the modules) visible vegetation elements 6, these modules being mounted in a stationary manner on said support structure, essentially hiding the latter.

According to the invention, the support structure consists essentially of at least two vertical rails 7 that are spaced apart, on which the modules 4 are mounted in vertical rows located at a distance from the facade or wall 2 and being individually removable.

Each module 4 comes in the form of a generally flat vat 8, with the shape of a parallelepiped, with a small thickness relative to its lateral dimensions and with a bottom wall 9 and lateral walls 10, 10', 11, 11' that are essentially solid.

The open surface of the vat 8, which is opposite to the bottom 9, is closed by an openwork wall 12 holding the substrate 5 and allowing passage of vegetation elements 6, and the opposite lateral walls 10 and 10', oriented vertically after installation, of each vat 8 are provided with hanging elements 13 that are designed to interact with suitable receiving sites (14) that are present on the mounting rails 7.

Herein, the vertical and horizontal directions must be understood as being defined relative to the mounted and attached device 1.

As in particular FIGS. 4A, 4B, 5, 7, 10 and 11 of the accompanying drawings show, the device for covering with vegetation 1 generally comprises a plurality of modules 4 arranged in one or more vertical rows and one or more horizontal rows.

According to a first characteristic of the invention, following especially from the aforementioned figures, the hanging elements 13 consist of pins or fingers that are attached or molded on the pertinent lateral walls 10 and 10', and the vertical rails 7 consist of sections comprising one wing 15 that is provided with cut-outs 14 forming the receiving sites, these cut-outs 14 emerging at the level of the free edge 15' of said wing 15 and defining an installation position that is blocked under the action of the weight for said modules 4 in the installed position.

Figure 8:
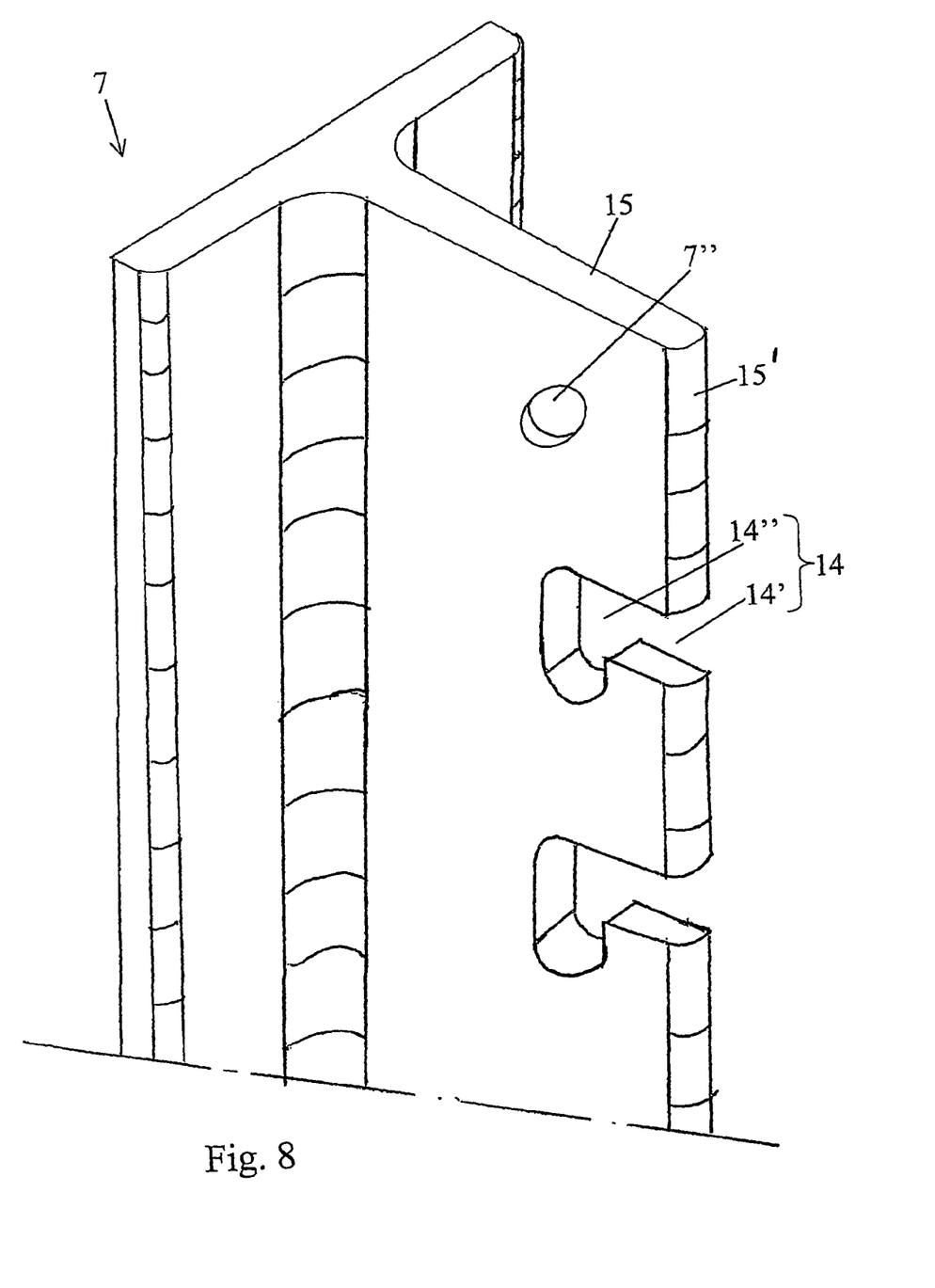
FIG. 8 is a partial detail perspective view of one embodiment of a hanging rail that is part of the support structure of the device for covering with vegetation according to the invention.

Preferably each cut-out 14 has essentially the shape of an L, with a segment 14' emerging from said cut-out 14, which segment is oriented essentially horizontally, and with the other obstructed segment 14" oriented essentially vertically toward the bottom, after attachment of the rail 7 under consideration to the facade or the wall 2. Moreover, the dowels or pins 13 of the two opposing lateral walls 10 and 10' of each vat 8 are mutually staggered in the vertical direction, considered in the position of installation of the modules 4, each rail 7 comprising locations 14 for receiving the dowels or pins 13 of two adjacent vertical rows of modules 4 (FIG. 8).

The modules 4 are accordingly each mounted by hanging between two parallel vertical rails 7, being laterally spaced at a minimum distance for ensuring visible continuity of the vegetation-covered appearance and for enabling coverage of the gaps between modules (and thus the support structure) by plants or similar vegetation elements 6 supported by the modules 4. Each rail 7 is used to support two vertical rows of modules 4.

Thus, the dowels or pins 13 of the two modules 4 opposite, of the same level and adjacent, can each be extended into a corresponding cut-out 14 of the rail 7 located between them. It is thus possible, due to the fact that their pins or fingers 13 do not coincide, to move the two adjacent modules laterally closer to one another to a distance that is just slightly greater than the length of said dowels or pins 13, preferably greater than the number of two per wall 10, 10' (FIGS. 1, 2A, 7 and 11).

It should be noted that other forms of cut-outs yielding a blocking position are equally possible, the L shape being very simple to implement.

Advantageously and as follows from FIGS. 4A, 4B, 5 and 13, each rail 7 consists of an L or T section and the relative arrangements, on the one hand, of the dowels or pins 13 at the level of the walls 10, 10' and, on the other hand, of cut-outs 14 at the level of the wings 15 for hanging rails 7 are such that the free edges 15' of said wings 15 are located recessed relative to the visible front surface of the modules 4 after their installation.

Figure 4A:
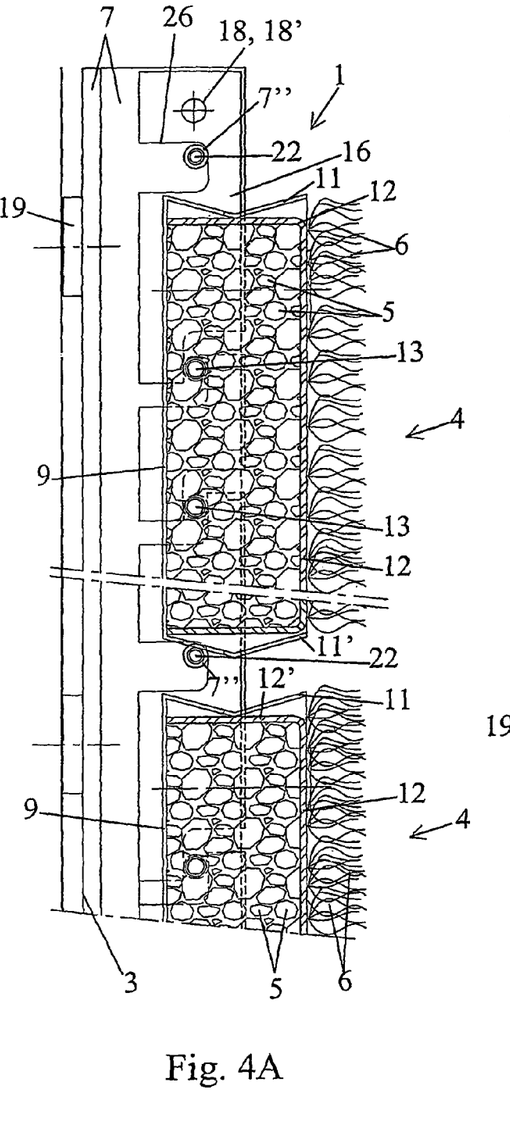
FIGS. 4A and 4B are partial views in a vertical section of a device for covering with vegetation according to the invention, with modules filled with the substrate and bearing plants (FIG. 4A) and with empty modules (FIG. 4B—shown without the substrate for better illustration of the manner of installation) respectively.
Figure 4B:
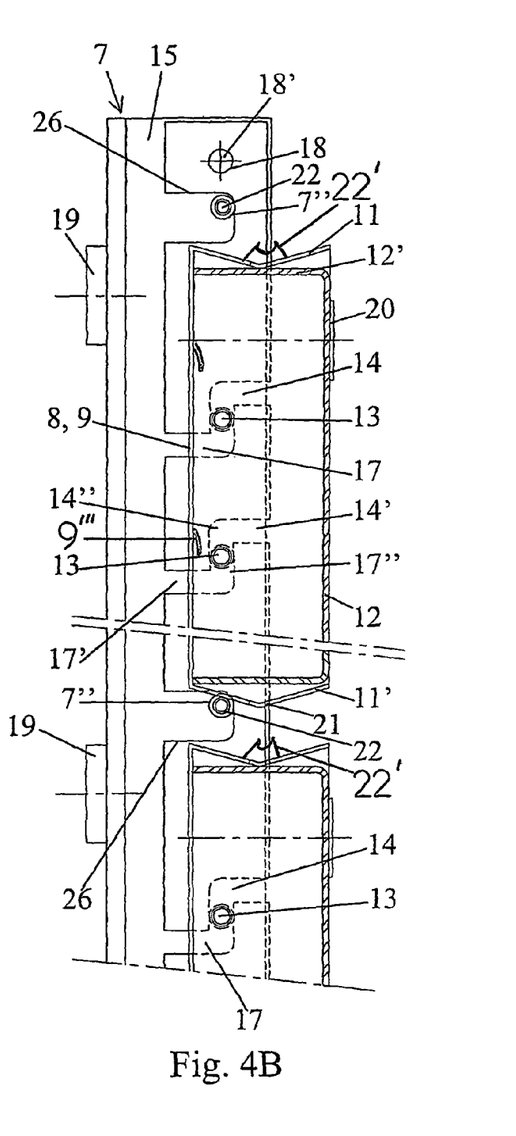
Figure 5:
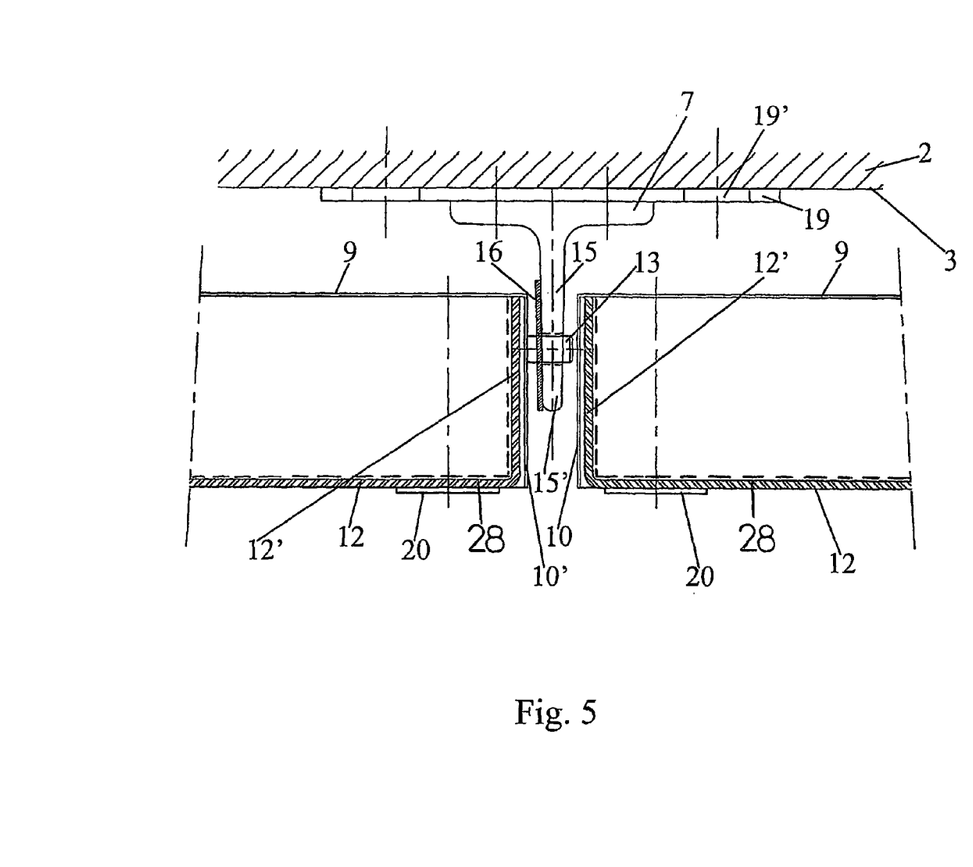
FIG. 5 is a partial view, in a horizontal section and from above, of a device for covering with vegetation, the modules being shown without substrate and plants for better illustration.
Figure 6:
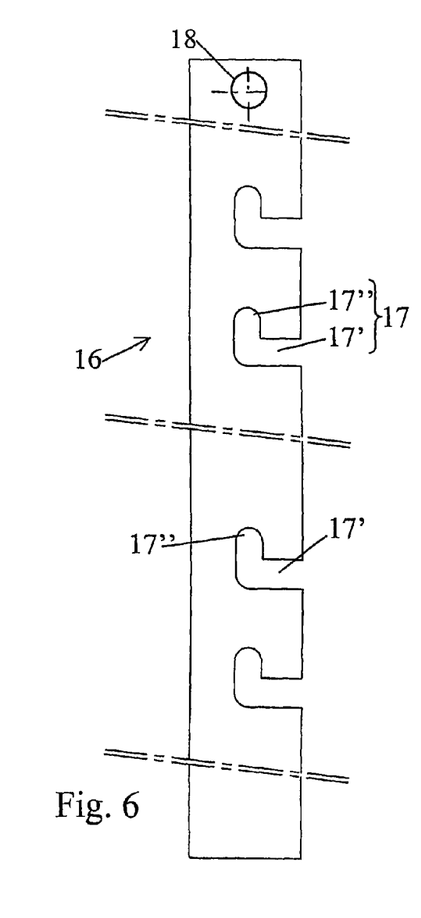
FIG. 6 is a partial view in a lateral elevation of a locking section of modules in the installed state shown in FIG. 5.
Figure 7:
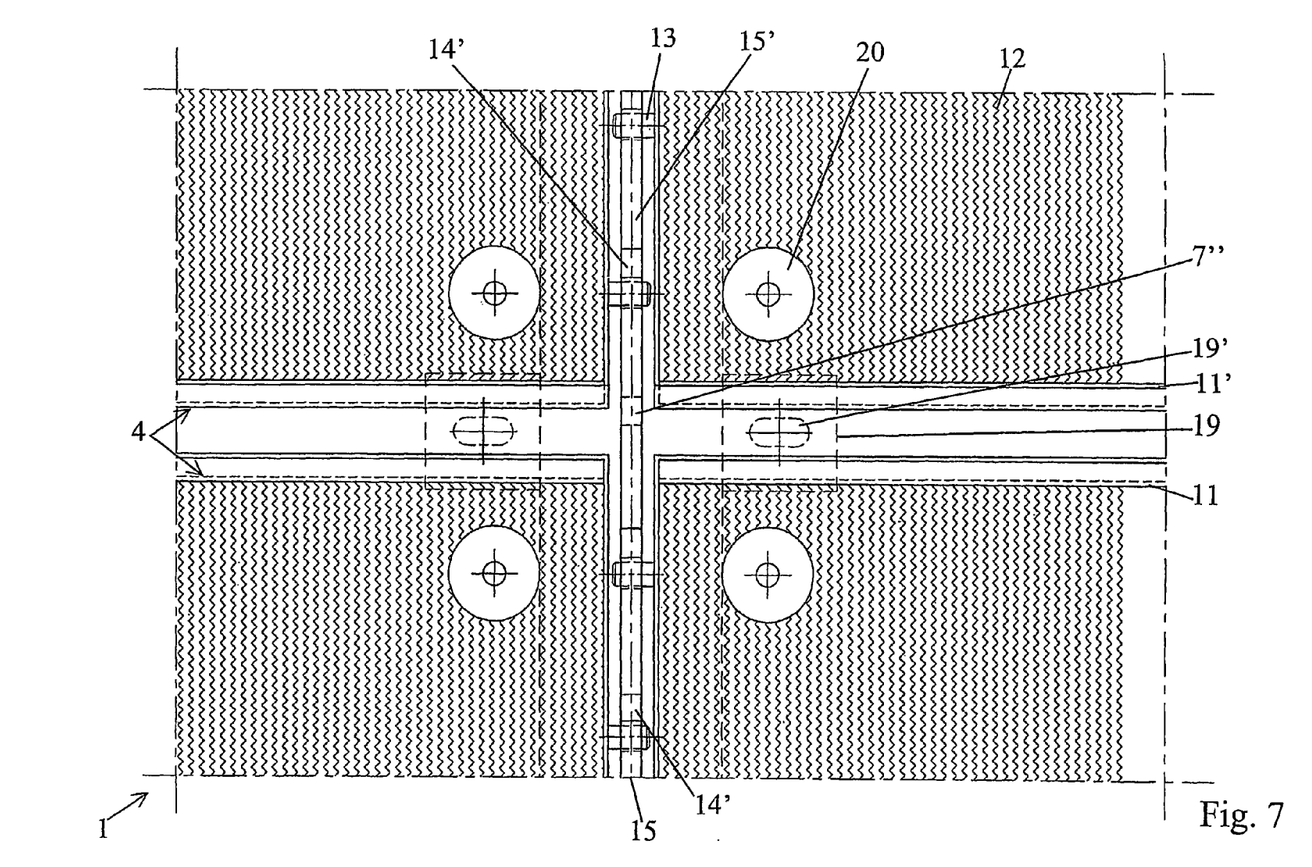
FIG. 7 is a partial view in a front elevation of a device for covering with vegetation according to the invention, the substrate and plants not being visible.

In order to prevent unauthorized or accidental release of a module 4, it can be provided that the device for covering with vegetation comprises, at the level of each rail 7, a means of locking in the mounted state of modules 4 in the form of a section 16, for example a flat head or a U section, provided with cut-outs 17 coinciding respectively with those 14 of said rails 7, allowing engagement of the dowels or pins 13 of the modules 4 in their installed state and able to lock the latter in the blocked installation position (FIGS. 4, 5, and 6).

When the dowels or pins 13 have a length sufficient to completely traverse and extend beyond the opposite side of the wing 15, a single flat section can suffice.

According to one preferred embodiment, the cut-outs 17 of each locking section 16 have an L shape, with a segment 17' emerging, oriented essentially horizontally and with another obstructed segment 17" oriented essentially vertically toward the top, when said section 16 is in a position installed on a rail 7, each locking section 7 also comprising, preferably at its upper end, a hole 18 for passage of a rod or bar 18' for blocking in translation, the latter likewise passing through the corresponding perforations made in the hanging rails 7.

Figure 13:
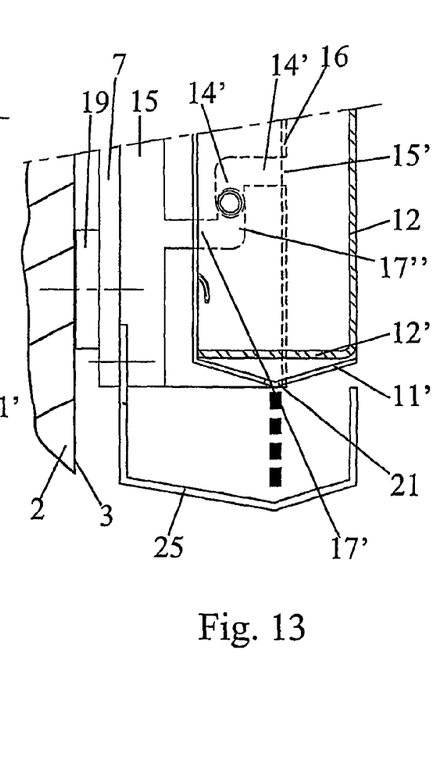

Thus, said sections 16 can be locked in a stationary manner in their locking position when the dowels, pins, or lugs 13 are gripped by shearing by the interaction of the bottoms of the obstructed segments 17" of the cut-outs 17 of said sections 16 with the bottoms of the obstructed segments 14" of the cut-outs 14 of the wings 15 of the rails (see FIGS. 4B and 13).

Figure 9A:
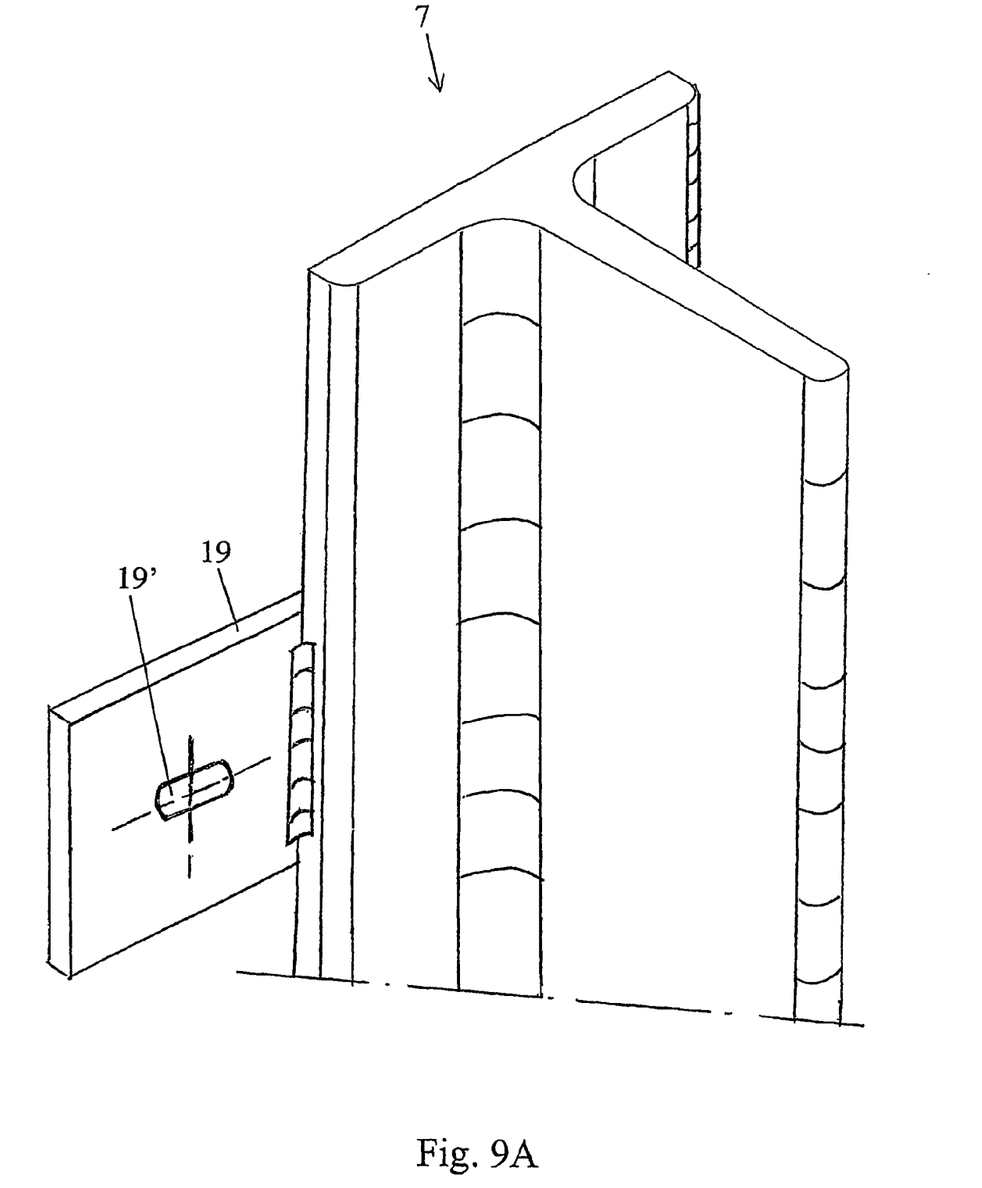
FIGS. 9A and 9B are views that are similar to that of FIG. 8, illustrating two variants of attachment of a hanging rail (the cut-outs are not shown)
Figure 9B:
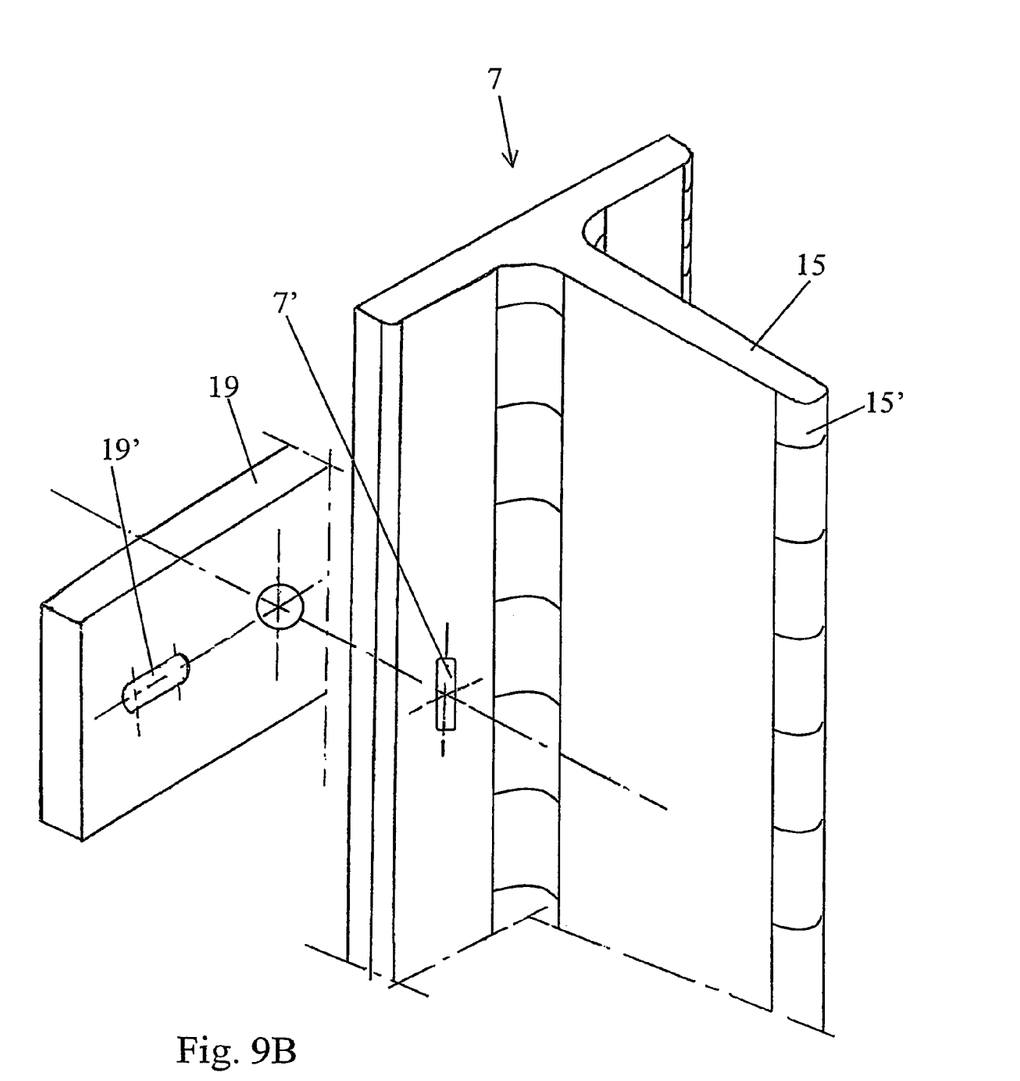
Figure 10:
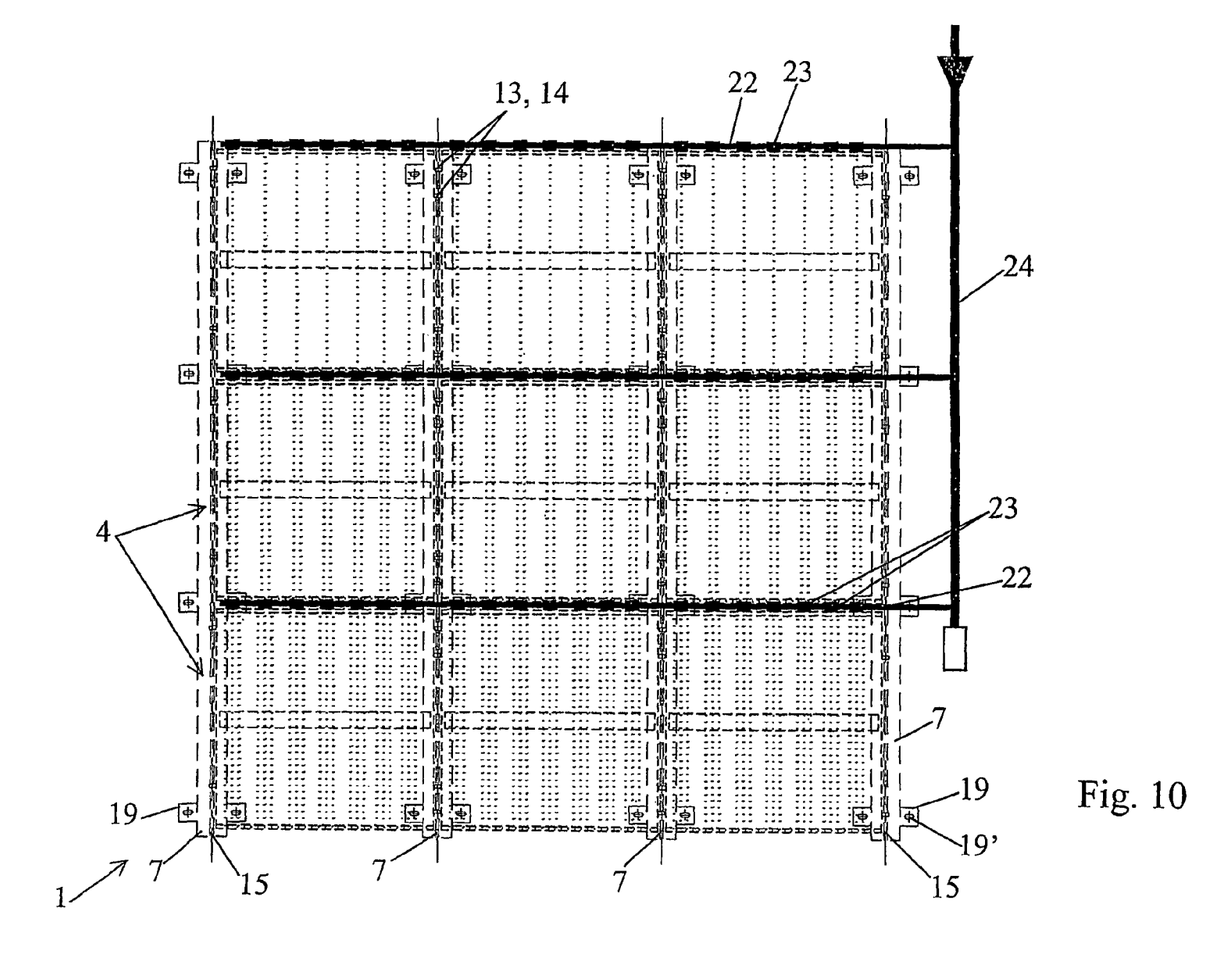
FIG. 10 is a front elevation of a device for covering with vegetation according to the invention, composed of nine modules, this representation schematically illustrating the irrigation network that is part of said device and the course and the flow of the irrigation liquid.
Figure 11:
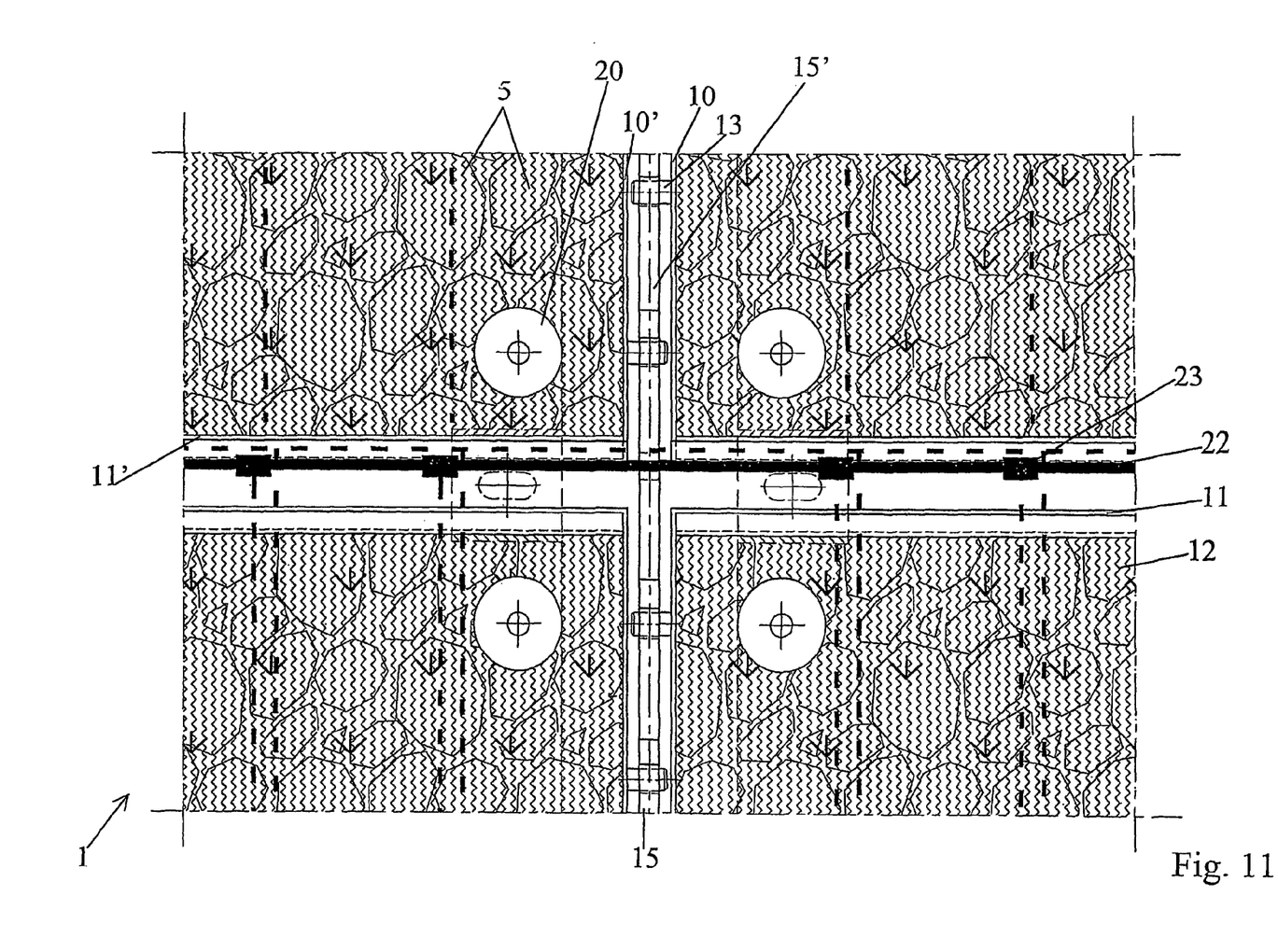
FIG. 11 is a partial view that is identical to that of FIG. 7, the substrate, the local portion of the irrigation network and the water flow being shown in addition.

According to two preferred variant embodiments shown in FIGS. 9A and 9B of the accompanying drawings, each rail 7 is fixed on the surface 3 of the facade or wall 2 to be covered via at least two small plates 19 comprising oblong crosswise openings 19' that are oriented in the horizontal direction, the rail 7 being integral with said small plates 19 by welding or by screwing or by bolting; in the latter case, the screws or bolts can be accommodated in oblong holes 7' that are oriented vertically and arranged in said rail 7.

Thus, it is possible to control the spacing between rails 7 (oblong holes 19') and optionally the vertical position of rails 7 (oblong holes 7').

According to a first embodiment, the flat vats 8 consist of plastic vats molded optionally from reinforced plastic, at least one analogous separating rib or wall 9' being formed or attached to their base wall 9, thus subdividing the internal volumes of said vats 8 into two compartments in the horizontal direction (defined for said vats 8 after mounting modules 4 on the vertical rails 7).

Figure 1:
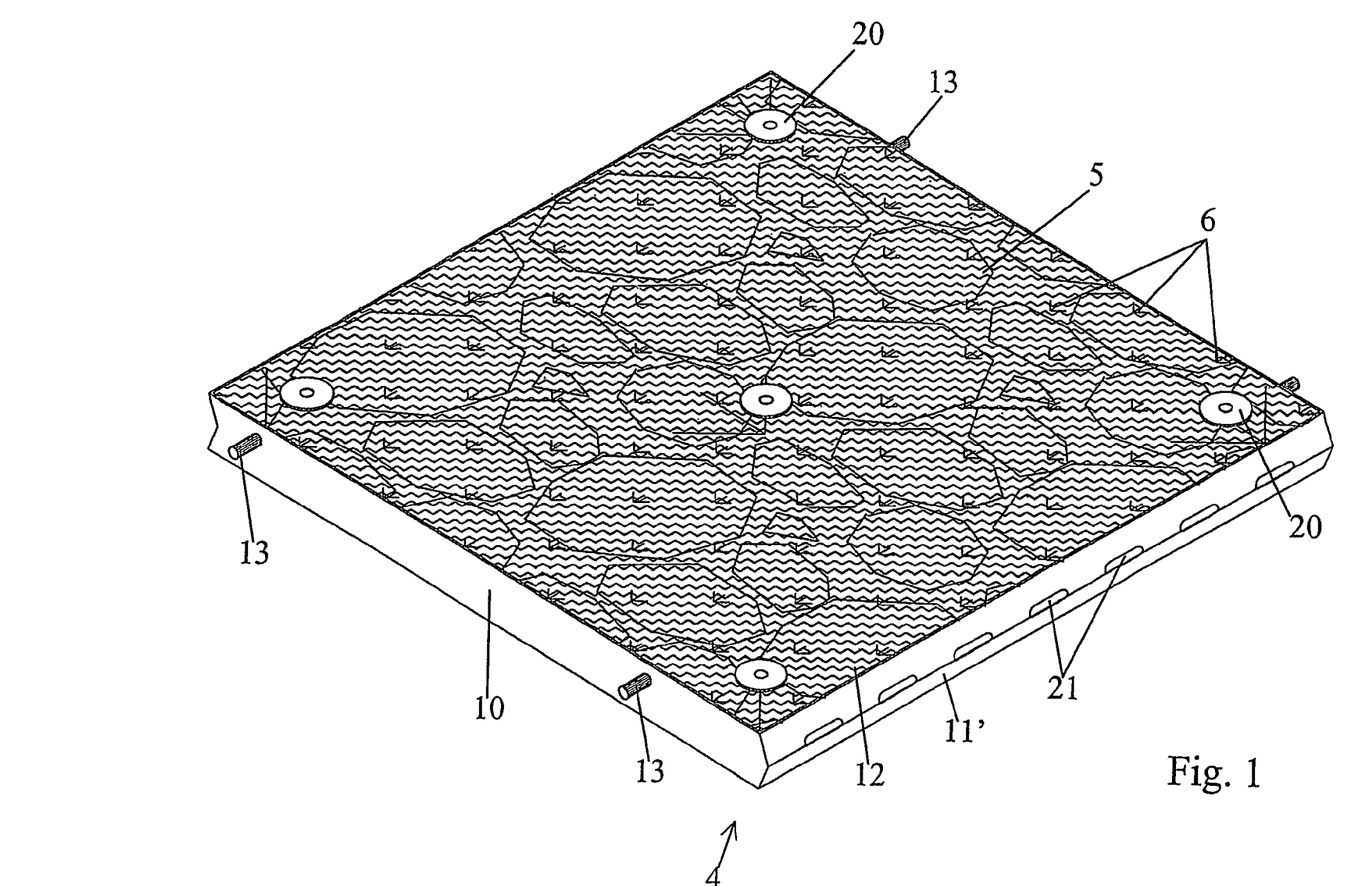
FIG. 1 is a perspective view of one module of a device for covering with vegetation according to the invention.
Figure 2A:
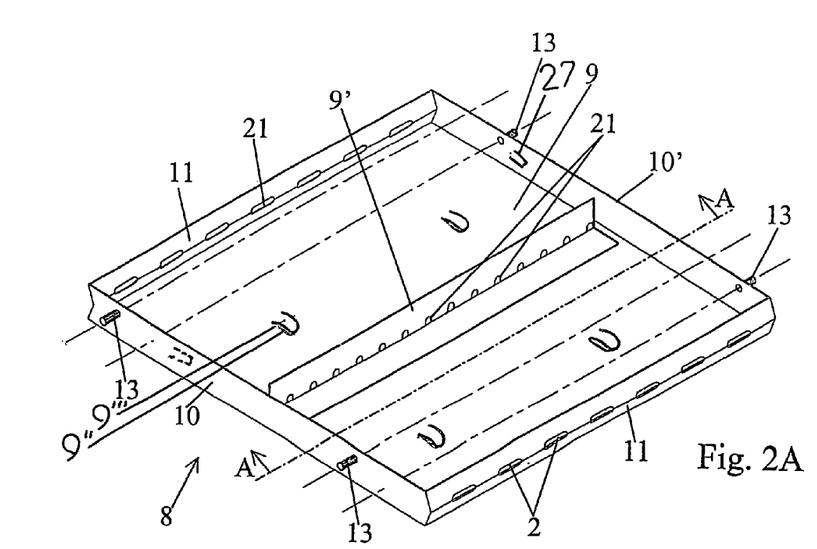
FIG. 2A is a perspective view of a vat that is part of a module according to the invention.
Figure 2B:
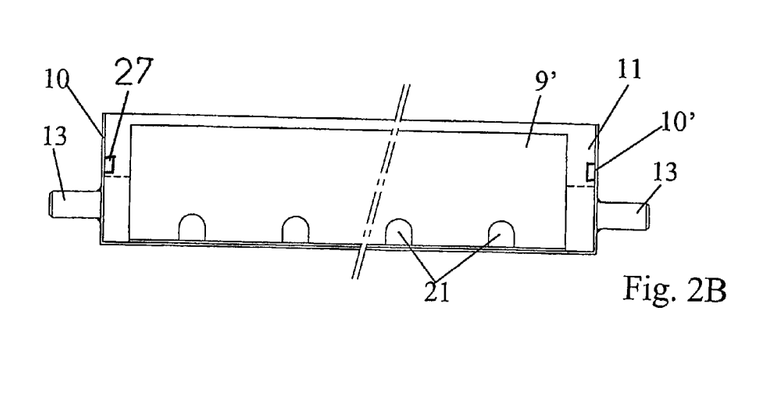
FIGS. 2B and 2C are views, on different scales, in a horizontal section (according to A-A parallel to the upper and lower walls) and side elevation of the vat shown in FIG. 2A, respectively.

According to a second embodiment, the vats 8 with a flat configuration consist of metallic vats formed all in one block based on portions of cut-out galvanized sheet metal, folded and assembled by welding at the level of the joining edges of the lateral walls 10, 10', 11, 11', at least one analogous separating rib or wall 9' being formed or joined to their bottom wall 9, thus subdividing the internal volumes of said vats 8 into two compartments in the horizontal direction (FIGS. 2A and 2B).

According to a third embodiment, it can be provided that the vats 8 are made of reinforced or unreinforced plastic and that these vats are surrounded by a metallic frame supporting the hanging element 13 (not shown).

Preferably and as FIGS. 1, 3, 4, 5 and 7 of the accompanying drawings show, the openwork wall 12 is latticed, for example made of expanded metal, and comprises at least two folded lateral edges 12' opposite and in immediate proximity to the inside surfaces of the vertical lateral edges 10 and 10' of the pertinent vat 8.

Said wall 12 is, for example, combined with said vat 8 by means of small plates or washers 20 interacting with the fastening screws that are integral with the bottom wall 9 of said vat 8. The wall 12 can likewise have four folded edges 12', one at the level of each of its sides.

In order to allow and facilitate irrigation by vertical flow, the upper 11 and lower 11' opposite lateral walls of the vats 8, oriented horizontally after installation of the modules 4, have a concave shape and a convex shape, viewed from outside, in profile or cross-section respectively, these shapes being rounded or angular and these walls 11 and 11' and, if need be, the separating rib or ribs or walls 9' comprising perforations 21 for the passage of liquid.

The perforations 21 of the walls 11 and 11' will advantageously be at the bottom of the concave or convex section, for example in the shape of a chevron.

According to one major additional characteristic of the invention emerging especially from FIGS. 10 to 13, the device 1 can likewise comprise an irrigation network comprising a plurality of horizontal pipe parts (22), each connected to one horizontal row of modules 4 and including for each module 4 one or more calibrated discharge openings or one or more emitters 23, distributed lengthwise along the part under consideration.

These horizontal pipe parts 22 are either supplied by a main pipe 24 with a vertical extension and are interconnected, or are integrated in a single pipe all in one block.

A gutter or similar elongated recovery means 25 extends, if need be, under the bottom end of the last horizontal row of modules 4.

According to a first embodiment that is not shown, the horizontal pipe parts 22 are housed, preferably in a stationary manner, in horizontal reinforcement sections arranged in the bottom wall of the vats, in the vicinity of the top end of the modules 4.

According to a second embodiment shown in the aforementioned figures, the horizontal pipe parts 22 each extend above the upper lateral walls 11 of a horizontal row of modules 4 by being supported in crosswise holes 7" arranged in the vertical hanging rails 7.

Figure 12:
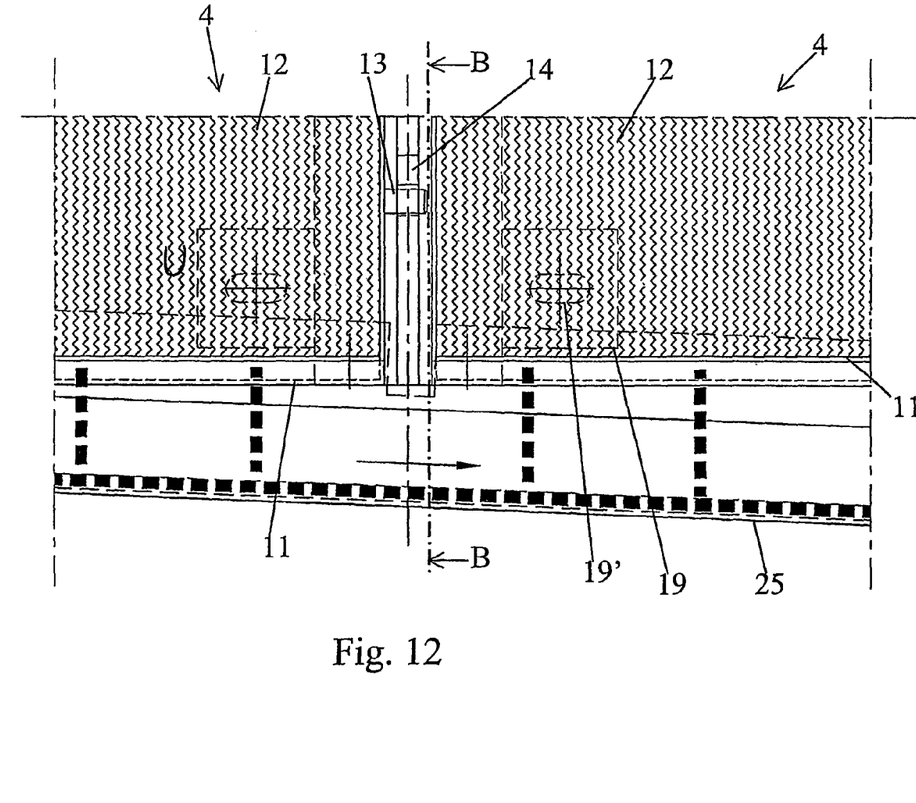
FIG. 12 is a partial front elevation of the lower part of a device for covering with vegetation according to the invention and FIG. 13 is a cutaway view along B-B of the object of FIG. 12.

As FIGS. 12 and 13 show, the lower recovery gutter will be inclined to the lateral side of the device 1 with a view to the natural flow of the irrigation liquid having streamed along the modules 4.

As these figures likewise show, the gutter 25 can advantageously have a U-shaped transverse section with a bottom provided with a longitudinal bending line forming a bottom point. This gutter 25 is fixed on the lower ends of the rails 7 before installing modules 4 and has a discrete shape, being essentially joined and flush with the lower row of modules 4.

In order to provide light modules 4 that are easy to handle and to limit irrigation constraints, the substrate 5 is composed essentially of granulates of expanded and/or porous material with high water retention and the vegetation 6 is of the covering type with low water consumption.

More exactly, the substrate can be based on light to ultralight porous, i.e. volatile, mineral granulates worked in a regular and fine (0 to 10 mm) granulometric curve, on the one hand of organic matter, improvements, long-lasting fertilizers. These characteristics offer a long-lasting water retention capacity (water trapped in a fine capillary network) and constant aeration of the cultivation medium. They reduce the risks of volume loss and are not affected by weather (in contrast to predominantly organic cultivation substrates).

With regard to the vegetation elements 6, they can be chosen mainly in the range of plants having been proven in "large-area coverage of roofs with vegetation" (xerophilic, hardy ground-cover plants), and secondly in that of native plants naturally covering walls (so-called "rock fissure" plants, likewise hardy). Strict adaptation is accomplished relative to exposure (sun, semishade, shade), an essential characteristic for perennial vegetation in the situations of the device.

The vegetation is cultivated beforehand for several months. The use of rolls of vegetation precultivated on a frame is likewise an option that the device can use.

The aforementioned indicates that the installation of a device 1 for covering the flat surface 3 of a facade or wall 2 with vegetation is done normally as follows:

Attachment with adjustment of the small plates 19 on the facade or the wall 2, then attachment with adjustment of the rails 7 on said small plates 19 (in one version of attachment with adjustment of the rails 7 via the small plates 19 welded onto them);

Installation of the irrigation network 22, 23, 24 and the gutter 25;

Hanging of different modules 4 by inserting the pins or dowels 13 into the segments 14' of the cut-outs 14 of the rails 7 and by pushing them until they are wedged at the bottom of consecutive segments 14";

Placing different locking profiles 16 by positioning them with the inlets of the segments 17' emerging from the cut-outs 17 opposite the lugs or pins 13 of the modules 4 that have already been hung, then by carrying out a horizontal translational movement followed by a vertical translational movement toward the bottom until said lugs or pins 13 are wedged at the bottom of the segments 17" of the cut-outs 17 of said sections 16;

Installation of the crosswise blocking rod 18'.

The locking sections 16 will likewise comprise indentations or cut-outs 26 allowing the passage of pipe parts 22 and making possible the movement of these sections 16 without interfering with said pipe parts 22.

As shown by the accompanying drawings and the aforementioned, the device 1 for covering with vegetation according to the invention can be, by way of example, composed mainly of modular elements 4 of small thickness and low unit weight, mounted on a hidden support structure 7, 19. The modules 4 can be dismantled and can work independently, which can allow "green spots" in isolation on a wall 2, or initiation of vertical coverage with vegetation from a height inaccessible to vandalism.

These modules have climbing, homogenous, or to a certain degree, "landscaped" vegetation. The device 1 advantageously integrates a direct water supply at the level of each module 4. Maintenance is limited to sequential delivery of water, staggered in time, which is optimized by use of a specific substrate and vegetation that is not water-intensive. A several-centimeter air layer between the modules 4 and the wall 2 supports aeration and thermal efficiency for the structure. The modularity likewise allows installation of another type of covering locally (wood, metal or other) in place of one or more vegetation-covered modules 4.

Preferably the modules 4 are flat vats (thickness of less than 8 cm, preferably between 4 and 8 cm), of dimensions that make them easy to handle (60×60 cm or more) and especially by one or two installer(s). Their internal structure makes it possible to split up the possible shrinkage of the substrate 5 that will be deposited there. The bottom 9 and the lateral walls 10, 10', 11, 11' of the vat are solid. The top of the vat has latticework 12 (can be expanded metal) of a cross-section suited to holding the substrate 5 but allowing passage of the plants 6.

The component material of the modules 4 can be resistant plastic, and these modules can be produced by hot molding and can include reliefs that form compartments.

As a variant, the component material of the modules can be galvanized metal. The top 11 and bottom 11' walls have a "concave" and "convex" profile respectively, and are perforated to allow water to circulate, and effective compartmentalization is accomplished by openwork horizontal metallic strips 9'. The resistance of the material makes it possible to laterally attach metal sleeves or dowels 13 there that allow hanging of vats on the rails 7 of the support structure.

The granular substrate 5 is very light and essentially mineral (especially expanded material). Its granulometric curve and its low content of organic material preclude shrinkage over the long term that could have an adverse effect on the vegetation or the aesthetic impression of the combination (this in contrast to a substrate of the mineral wool type).

The plants 6 are chosen from among those most resistant to drought, and also after observation of those spontaneously sprouting on the walls (vertical part), especially succulents. Their selection takes into account the exposure of the surfaces that is necessarily cut vertically.

The watering irrigation is distributed by a casing or pipe parts 22 to integrated emitters 23 that are 8 mm in diameter, located every 15 cm. The network is automatically programmed and can optionally include recycling of the irrigation liquid, optionally combined with treatment.

For each module 4, this casing can be inserted into a special section of the bottom of the vat 8 that remains accessible from the outside, but that irrigates the inside. The water is supplied from top to bottom for each vertical row. The excess water runs into the ground.

As a variant, this casing can be inserted above each horizontal level into holes 7" that are made in the support structure. The water enters the vats by virtue of the concave profile of the top edges, and is channeled to the lower vat by the convex profile of the bottom edges. In the bottom part of the structure, the vats 8 are provided with a metallic strip located 20 mm from the bottom edge, the latter then forming a gutter that channels the excess water to the local outlets after connecting the vats to one another (variant relative to a single lower gutter collecting the runoff from all the vats). If continuous irrigation is not necessary on one or more vats (openings present in the hanging wall, localized choice of another covering), the emitters can be individually neutralized upon implementation or later.

The support structure is composed of specific vertical rails 7 with the width of the vats, these rails being attached to the wall 2 to be covered.

The rails use metal T sections comprising notches allowing the hanging, the unhanging and the locking of the modules. These modules can advantageously be individually dismantled.

Additional characteristics can be provided at the level of the modules 4, as shown below.

Thus, the bottom wall 9 of each module 4, or at least of certain modules 4, can be perforated and can include spaced openings 9".

The latter, on the one hand, allow, in the horizontal position of the module 4 (during the precultivation phase), drainage of an excess of nutrient liquid or water for watering, and on the other hand, aeration of the substrate 5 in the vertical position of said module 4 (when the latter is installed on the support structure).

Figure 2C:
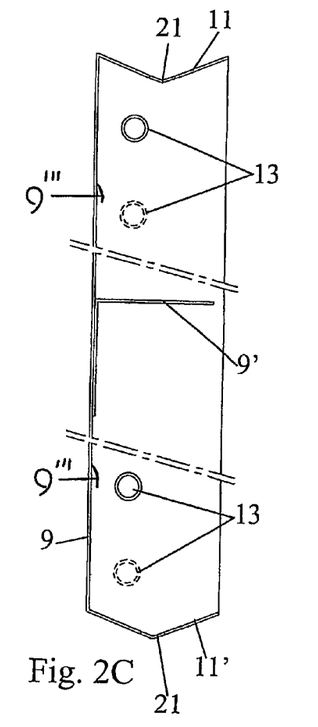
Figure 3:
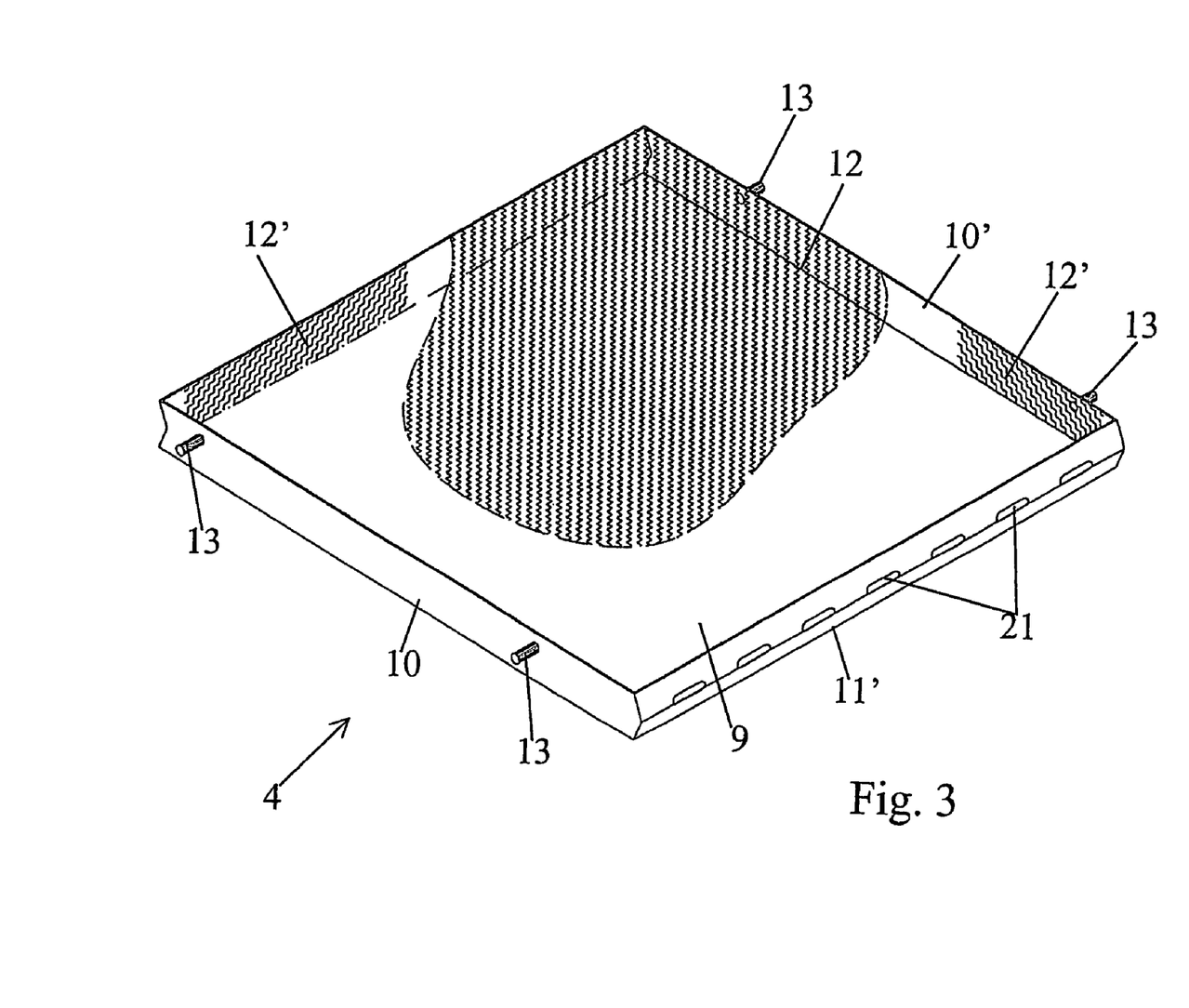
FIG. 3 is a view similar to that of FIG. 1, the module being empty.

The openings 9" can advantageously come in the form of punctures or cut-outs in the wall 9, defining tongues 9''' that extend at an interval from the inside surface of said wall 9 (FIGS. 2C, 2A, 4B). Thus, the irrigation liquid will be able to flow normally through the openings 9" in the horizontal position of the module 4, while it will have a tendency to flow on the tongues 9''' and above the openings 9" when the module is in the essentially vertical position, thus limiting liquid losses while allowing aeration of the substrate.

The modules 4 can also be provided, especially in the absence of the crosswise openings 7", with means 22' for stationary hanging of the horizontal pipe parts 22 at the level of the upper horizontal lateral walls 11 of said modules 4, for example in the form of means for holding by elastic engagement (FIG. 4B) mounted above openings 21 of said walls.

The modules 4 can likewise be provided with additional hanging means 27 for handling modules 4 (especially of large dimensions or for raising them to great heights) by means of a fork of a carriage (provided with pins at its ends). These means 27 can, for example, come in the form of two opposing cleats connected on the inside surfaces of the vertical lateral walls 10 and 10' and being inclined to the latter (FIGS. 2A and 2B).

In order to limit the loss of substrate 5 at the level of the edges of the modules 4, especially when the openwork wall 12 does not include the folded internal edges 12' or when the substrate is too fine compared to the latticework of said wall, the latter can be doubled by a second interior wall 28 with finer or tighter latticework, for example a flexible, synthetic, rot-proof material, and provided with folded lateral edges (in broken lines in FIG. 5). The wall 12 will guarantee rigidity on the front surface of the modules 4 in any case.

One skilled in the art will notice that the composition of the device according to the invention allows genuinely easy implementation and dismantling, of both the vats and irrigation.

The possibility of precultivation before installation on site allows limitation of interventions and monitoring after installation, especially considering the use of a water-retaining cultivation substrate and hardy and resistant plants.

Moreover, controlled watering and recovery of excess water from watering allow cost and environmental impact to be limited.

The possibility of locking allows the device to be used in public venues.

The self-contained nature of the installation makes it an element of urban construction and its use as a guardrail can be envisioned, for example.

Of course, the invention is not limited to the described embodiment shown in the accompanying drawings. Modifications remain possible, especially from the standpoint of the composition of the various elements or by substitution of technical equivalents, without necessarily exceeding the scope of protection of the invention.

The invention claimed is:

1. Device for covering facades or walls with vegetation, comprising:

a support structure attached to the front of the facade or wall; and at least two modules with a flat structure, square or rectangular, containing a cultivation substrate and having on one of its major surfaces visible vegetation elements, these modules (4) being mounted in a stationary manner on the support structure (7, 19), said support structure comprising of at least two vertical rails (7), spaced apart from one another, on which the modules (4) are mounted in vertical rows by being located at a distance from the facade or wall (2), and by being individually removable, each module (4) coming in the form of a generally flat vat (8), with the shape of a parallelepiped, with small thickness relative to its lateral dimensions and with a bottom wall (9) and lateral walls (10, 10', 11. 11'), and the open surface of the vat (8) that is opposite to the bottom wall (9) being closed by an openwork wall (12) allowing the passage of vegetation elements (6), the openwork wall (12) being suitable for holding the substrate (5) but allowing the plants (6) to pass, wherein the opposing lateral walls (10 and 10'), oriented vertically after installation, of each vat (8), are provided with hanging elements (13) designed to interact with suitable receiving sites (14) that are present on the mounting rails (7), said modules (4) being mounted by hanging between two parallel rails (7), wherein the vat (8) has at least one separating rib or wall (9') formed with or attached to the bottom wall (9), thus subdividing the internal volume of the vat into plural compartments in the horizontal direction, and wherein the upper (11) and lower (11') opposite lateral walls of the vat (8), oriented horizontally after installation of the modules (4), have a concave shape and a convex shape, viewed from outside, in profile or cross-section respectively, these shapes being rounded or angular and these walls (11 and 11') and the separating rib or wall (9') comprising perforations (21) for the passage of liquid.

2. Device for coverage with vegetation according to claim 1, wherein the hanging elements (13) comprise dowels or pins attached or molded on the pertinent lateral walls (10 and 10') and wherein the vertical rails (7) comprise sections comprising one wing (15) provided with cut-outs (14) forming the receiving sites, these cut-outs (14) emerging at the level of the free edge (15') of said wing (15) and defining an installation position blocked under the action of the weight for said modules (4) in the installed position.

3. Device for coverage with vegetation according to claim 2, wherein each cut-out (14) is generally L-shaped, with a segment (14') emerging from said cut-out (14), which segment is oriented horizontally and with the other obstructed segment (14") oriented vertically toward the bottom, after attachment of the rail (7) under consideration to the facade or the wall (2), and wherein the dowels or pins (13) of the two opposing lateral walls (10 and 10') of each vat (8) are mutually staggered in the vertical direction, considered in the position of installation of the modules (4), each rail (7) comprising locations (14) for receiving the dowels or pins (13) of two adjacent vertical rows of modules (4).

4. Device according to claim 3, wherein each rail (7) comprises an L or T section and wherein the relative arrangements of the dowels or pins (13) at the level of the walls (10, 10') and of cut-outs (14) at the level of the wings (15) for hanging the rails (7) are such that the free edges (15') of said wings (15) are located recessed relative to the visible front surface of the modules (4) after their installation.

5. Device according to claim 3, further comprising means for locking in the mounted state of the modules (4) in the form of a section (16) provided with cut-outs (17) coinciding respectively with those (14) of said rails (7), allowing engagement of the dowels or lugs (13) of the modules (4) in their installed state and able to lock the latter in the blocked installation position.

6. Device according to claim 2, wherein each rail (7) comprises an L or T section and wherein the relative arrangements of the dowels or pins (13) at the level of the walls (10, 10') and of cut-outs (14) at the level of the wings (15) for hanging the rails (7) are such that the free edges (15') of said wings (15) are located recessed relative to the visible front surface of the modules (4) after their installation.

7. Device according to claim 6, further comprising means for locking in the mounted state of the modules (4) in the form of a section (16) provided with cut-outs (17) coinciding respectively with those (14) of said rails (7), allowing engagement of the dowels or lugs (13) of the modules (4) in their installed state and able to lock the latter in the blocked installation position.

8. Device according to claim 2, further comprising means for locking in the mounted state of the modules (4) in the form of a section (16) provided with cut-outs (17) coinciding respectively with those (14) of said rails (7), allowing engagement of the dowels or lugs (13) of the modules (4) in their installed state and able to lock the latter in the blocked installation position.

9. Device according to claim 8, wherein the cut-outs (17) of each locking section (16) come in the shape of an L, with a segment (17') emerging, oriented horizontally and with another obstructed segment (17") oriented vertically toward the top, when said section (16) is in the position installed on a rail (7), each locking section (6), moreover, comprising a hole (18) for the passage of a rod or bar (18') for blocking in translation, the latter likewise crossing the corresponding perforations made in the hanging rails (7).

10. Device according to claim 1, wherein each rail (7) is fixed on the surface (3) of the facade or wall (2) to be covered via at least two small plates (19) comprising oblong crosswise openings (19') oriented in the horizontal direction, the rail (7) being integral with said small plates (19) by welding or by screwing or by bolting, in the latter case the screws or bolts can be accommodated in oblong holes (7') oriented vertically and arranged in said rail (7).

11. Device according to claim 1, wherein the flat vats (8) consist of plastic vats molded from reinforced plastic.

12. Device according to claim 1, wherein the vats (8) with a flat configuration consist of metallic vats formed all in one block based on portions of cut-out galvanized sheet metal, folded and assembled by welding at the level of the joining edges of the lateral walls (10, 10', 11, 11').

13. Device according to claim 1, wherein the openwork wall (12) is latticed and comprises at least two folded lateral edges (12') opposite and in immediate proximity to the inside surfaces of the vertical lateral edges (10 and 10') of the pertinent vat (8) and wherein said wall (12) is assembled with said vat (8) by means of small plates or washers (20) interacting with fastening screws that are integral with the bottom wall (9) of said vat (8).

14. Device according to claim 1, further comprising a watering network comprising a plurality of horizontal pipe portions (22), each connected to one horizontal row of modules (4) and including for each module (4) one or more calibrated discharge openings or one or more emitters (23), distributed lengthwise along the portion under consideration, wherein these horizontal pipe portions (22) are either supplied by a main pipe (24) with a vertical extension and are interconnected, or are integrated in a single pipe all in one block.

15. Device according to claim 14, wherein the horizontal pipe portions (22) are housed in the vicinity of the top end of the modules (4).

16. Device according to claim 14, wherein the horizontal pipe portions (22) each extend above the upper lateral walls (11) of a horizontal row of modules (4) by being supported in crosswise holes (7") arranged in the vertical hanging rails (7).

17. Device according to claim 14, further comprising a gutter or a similar elongated recovery means (25) that extends under the bottom end of the last horizontal row of modules (4).

18. Device according to claim 1, wherein the substrate (5) comprises granulates of expanded and/or porous material with high water retention, and wherein the vegetation (6) is of the covering type with low water consumption.

* * * * *